United States Patent
Dieffenbach et al.

(10) Patent No.: US 10,467,171 B2
(45) Date of Patent: Nov. 5, 2019

(54) DETECTING THE DRIFT OF THE DATA VALID WINDOW IN A TRANSACTION

(71) Applicant: Cypress Semiconductor Corporation, San Jose, CA (US)

(72) Inventors: Kai Dieffenbach, Egelsbach (DE); Uwe Moslehner, Dreieich (DE); Jasmin Kotoric, Darmstadt (DE)

(73) Assignee: Cypress Semiconductor Corporation, San Jose, CA (US)

( * ) Notice: Subject to any disclaimer, the term of this patent is extended or adjusted under 35 U.S.C. 154(b) by 393 days.

(21) Appl. No.: 14/339,377

(22) Filed: Jul. 23, 2014

(65) Prior Publication Data

US 2016/0026593 A1 Jan. 28, 2016

(51) Int. Cl.
*G06F 9/46* (2006.01)
*H04L 7/00* (2006.01)
*G06F 13/40* (2006.01)
*G06F 1/08* (2006.01)

(52) U.S. Cl.
CPC ........... *G06F 13/4068* (2013.01); *G06F 1/08* (2013.01); *G06F 9/466* (2013.01); *H04L 7/0033* (2013.01)

(58) Field of Classification Search
CPC .............................. G06F 9/466; H04L 7/0033
See application file for complete search history.

(56) References Cited

U.S. PATENT DOCUMENTS

| | | | | |
|---|---|---|---|---|
| 5,948,083 A | * | 9/1999 | Gervasi | H04L 7/0337 375/334 |
| 6,864,715 B1 | * | 3/2005 | Bauer | G06F 1/025 326/46 |
| 2005/0276141 A1 | * | 12/2005 | Pelley | G11C 11/406 365/221 |
| 2008/0043782 A1 | * | 2/2008 | Skerlj | H04L 7/0008 370/516 |

* cited by examiner

*Primary Examiner* — Zachary K Huson

(57) ABSTRACT

Disclosed herein are system, apparatus, article of manufacture, method and/or computer program product embodiments for detecting the drift of the data valid window in a transaction. An embodiment operates by configuring a data capture range comprising data capture points, measuring values of a signal at the data capture points, and detecting the drift of the data valid window based on the values at the data capture points.

24 Claims, 5 Drawing Sheets

DETECTING THE DRIFT OF THE DATA VALID WINDOW IN A TRANSACTION

BACKGROUND

Generally, in synchronous serial communications, transmitted and received bits are synchronized to a common clock signal. When data is transferred between a transmitter and a receiver, a data valid window wide enough and occurring at a predictable time is used in order to ensure proper data capture by the receiver. The timing of the data valid window depends on the round-trip delay of the clock and data. This round-trip delay depends on the process, temperature, operating voltage conditions, and of the printed circuit board (PCB) layout. Although the process and PCB layout are stable, the temperature and operating voltage can vary over time. For example, the variation of the operating voltage has a much shorter time constant than that of the temperature.

One method for predicting the timing of the data valid window is a data learning pattern, such as the preamble pattern disclosed by U.S. Pat. No. 8,417,874, which is hereby incorporated herein by reference in its entirety. Using DLP, the transmitter sends a pre-determined data learning pattern at the beginning of each data frame. For each data line, the receiver can calibrate the data capture point so that it is in the center of the data valid window. However, for long data frames, there is the possibility that the timing of the data valid window drifts due to changes in the operating conditions, e.g. the operation voltage. In some cases, this drift may lead to a situation where the data cannot be reliably captured anymore, causing corruption of received data. Even with the use of DLP, the data corruption may not be detected within the data frame.

SUMMARY

Provided herein are system, apparatus, article of manufacture, method and/or computer program product embodiments, and/or combinations and sub-combinations thereof, for detecting the drift of the data valid window in a transaction.

An embodiment includes a computer implemented method for detecting the drift of the data valid window in a transaction. The method operates by configuring a data capture range comprising data capture points, measuring values of a signal at the data capture points, and detecting the drift of the data valid window based on the values at the data capture points.

Another embodiment includes a system for detecting the drift of the data valid window in a transaction. The apparatus includes a memory and at least one processor coupled to the memory. The processor is configured to configure a data capture range comprising data capture points, measure values of a signal at the data capture points, and detect drift of the data valid window based on the values at the data capture points.

A further embodiment includes a tangible computer-readable device having instructions stored thereon that, when executed by at least one computing device, cause the computing device to perform operations. The operations include configuring a data capture range comprising data capture points, measuring values of a signal at the data capture points, and detecting drift of the data valid window based on the values at the data capture points.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
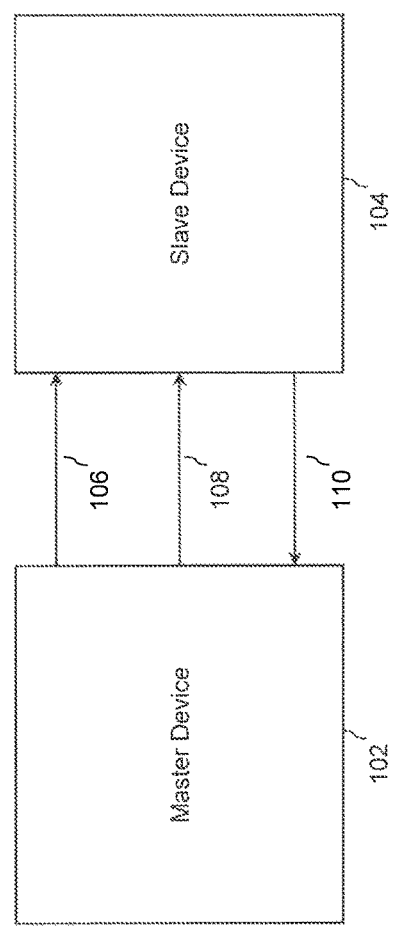
FIG. 1 is a block diagram of a system for detecting the drift of the data valid window in a transaction, according to an example embodiment.

FIG. 1 is a block diagram of an example system 100 that includes a master device 102, a slave device 104, a clock bus 106, a master out, slave in (MOSI) bus 108, and a master in, slave out (MISO) bus 110. Master device 102 or slave device 104 can be a processor, microcontroller (MCU) an integrated circuit, application-specific integrated circuit (ASIC), field-programmable gate array (FPGA), processing core, or any combination thereof. Although system 100 is depicted as having one master device, one slave device, and three buses, embodiments of the invention support any number of master devices, slave devices, and buses. For example, system 100 could have two buses, in which one is a clock bus and the other is a MISO or MOSI bus.

In an embodiment, master device 102 transmits a clock signal over clock bus 106 to slave device 104. Both master device 102 and slave device 104 use clock signal for synchronous, serial communication over one or more buses, e.g. MOSI bus 108 and MISO bus 110.

In an embodiment, master device 102, acting as the transmitter, transmits a data signal to slave device 104 over MOSI bus 108. Slave device 104 derives information from the data signal using, in part, the clock signal received from master device 102.

In an embodiment, master device 102, acting as the receiver, receives a data signal from slave device 104, acting as the transmitter, over MISO bus 110. Master device 102 derives information from the data signal using, in part, the clock signal it sent to slave device 104 over clock bus 106.

In an embodiment, master device 102 has one or more slave select buses (not shown) that connect to one or more slave devices, such as slave device 104. Master device 102 can transmit a signal over one of slave select buses to select the active stave device.

The data signal received by a receiver can experience distortion of the data signal's phase or frequency. The distortion can change over time, such as distortion caused by variation of design or operating conditions. As a result, the data valid window of the signal may drift and fall out of sync with the clock signal. In an embodiment, the receiver detects the drift of the data valid window in a transaction. For example, master device 102 can detect drift of the data valid window in a data signal received over MISO 110, or slave device 104 can detect drift of the data valid window in a data signal received over MOSI 108. Although master device 102 is the receiver in various of the following examples, embodiments of the invention support slave device 104 being the receiver.

Detecting drift of the data valid window in serial communications has numerous uses. For example, and without limitation, drift of the data valid window can be detected in communications between one or more memory controllers and one or more MCUs, one or more memory controllers and one or more other devices, or in communications between receivers and transmitters of synchronous serial protocols, in general.

Figure 2:
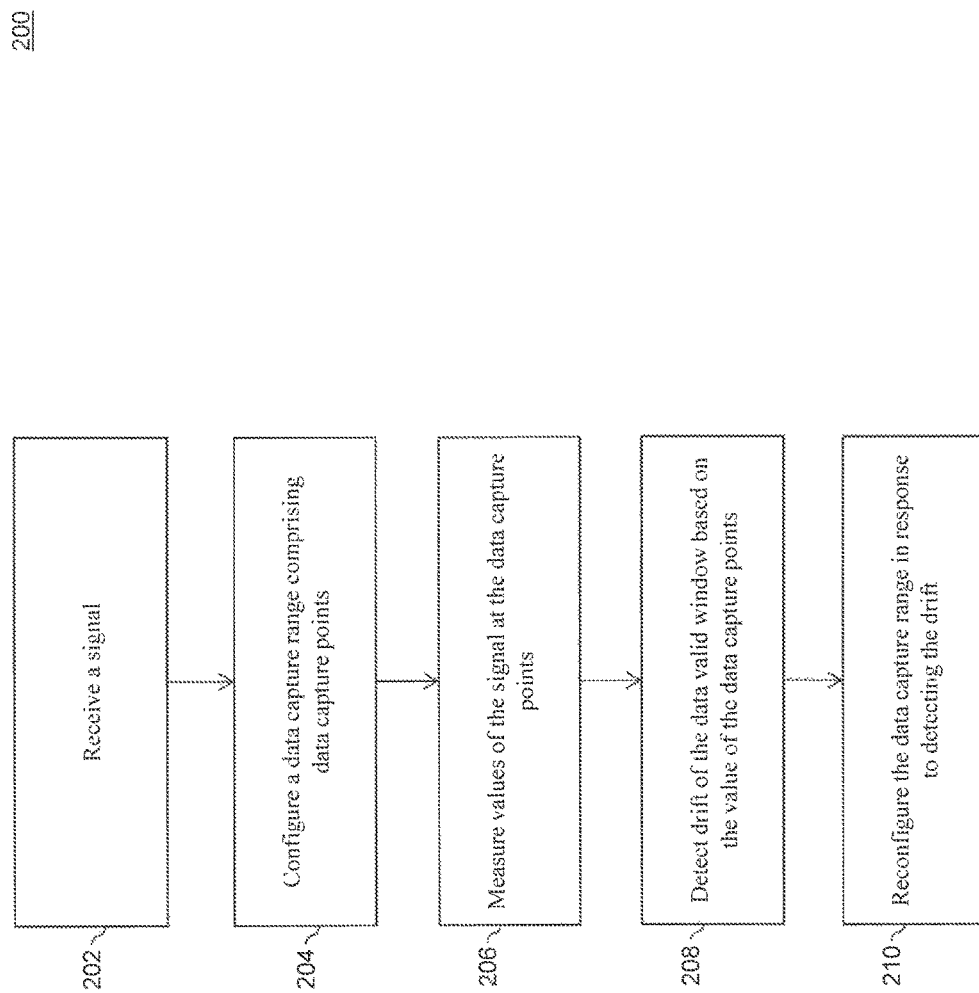
FIG. 2 is a flowchart illustrating a process for detecting the drift of the data valid window in a transaction, according to an example embodiment.

FIG. 2 is a flowchart illustrating a process 200 for detecting drift of the data valid window in a transaction, according to an example embodiment. Process 200 can be performed by processing logic that can comprise hardware (e.g., circuitry, dedicated logic, programmable logic, microcode, etc.), software (e.g., instructions run on a processing device), or a combination thereof. For example, process 200 may be performed by master device 102 or slave device 104.

In block 202, a signal is received. In an embodiment, master device 102 receives the signal from slave device 104 over MISO 110.

In block 204, a data capture range (DCR) comprising data capture points is configured to fall within the data valid window (DVW). In an embodiment, master device 102 configures the data capture range.

A DCR refers to a time period during which a value from the signal is read. In an embodiment, to capture the data reliably, the DCR is smaller than and positioned within the DVW. The DCR can be configured to correspond to regular events provided by a clock signal, such as a clock signal sent over clock bus 106. For example, for a clock signal having a cycle time t, a DCR can be configured to have a width of time t/2, and a series of DCRs can be configured to begin at ¼ t after the beginning of each cycle and end at ¼ t before the end of the cycle, respectively. Although this example of a DCR will be used for purposes of illustration, embodiments of the invention support DCRs with various widths and positions.

In an embodiment, the DCR is set based on a data learning pattern (DLP). A DLP may refer to a particular signal sent by the transmitter to the receiver. Because the characteristics of the DLP are known to the receiver, the receiver can synchronize an incoming signal to the clock based on the DLP. However, embodiments of the invention support other techniques for synchronizing an incoming signal to the clock, such using a fixed data pattern read from a particular address.

A DCR comprises data capture points (DCP). A DCP refers to a point in time within the DCR at which data from the signal is read. In an embodiment, the DCR has three DCPs—a left DCP, a center DCP, and a right DCP. The center DCP may occur at the center of the DCR. The left DCP may occur at the beginning of the DCR, and the right DCP may occur at the end of the DCR. Although these example DCPs will be used for purposes of illustration, embodiments of the invention support DCRs with any number of DCPs, and the DCPs can be configured to occur at any times within the DCR. For example, a DCR may have two DCPs defining the start and the end of the DCR. The DCR itself can be arbitrarily located within a DVW. As another example, a DCR may have eight DCPs that are spaced at equal time intervals within the DCR. Similarly, although the term "center" is used when referring to the center DCP, the center DCP is not limited to occurring only at the center of the DCR, and other embodiments of the invention support a DCR having a center DCP that occurs at any other point other than the center of the DCR. Any one of the values measured at the DCPs can be used as the value of the signal during the DVW. For example, the value measured at center DCP can be used as the value of the signal during the DVW.

The size and arrangement of the DCR within a DVW can impact the sensitivity of the receiver to detecting drift. For example, if the DCR is rather small compared to the DVW so that the DCPs are placed closer together and farther from the edges of the DVW, the DVW may not detect drift as readily as other configurations. This can result in a transaction experiencing drift being able to continue longer, but can also result in being less sensitive to drift of the DVW. In another example, when the DCR is getting near to the size of the DVW so that the DCPs are placed farther apart and closer to the edges of the DVW, the DCR can detect a drift of the DVW more readily than other configurations. This can result in more frequent detections, which can improve sensitivity but can result in more frequent reconfigurations of the DCR or restarting of the transaction.

In block 206, values of the signal at the DCPs are measured. In an embodiment, master device 102 measures the values of the signal at the DCPs. Measuring the values can include determining whether the signal represents a high or low value, a logical 1 or 0, or any one of a range of values. The values may be measured by detecting levels of voltage, current, or any combination thereof. A measured value may be the same at different DCPs even though the signal is not identical at the different DCPs. For example, the measured values at two DCPs may both be a logical 1 even though the voltages measured at those DCPs vary, e.g. 2.4 V and 2.3 V.

In block 208, drift of the DVW is detected based on the value of the DCPs. In an embodiment, master device 102 detects the drift of the signal.

In an embodiment, master device 102 detects drift of the DVW with a DCR having two DCPs when the values measured at two DCPs differ. For example, within the DCR, the value at a first DCP may be measured as a 1, and the value at a second DCP may be measured as a 0. Because the measured values differ, drift of the DVW is detected, and consequently, the points within the DCR cannot all be reliably measured to have the same value.

In an embodiment, master device 102 detects drift of the DVW with a DCR having three DCPs (e.g. left DCP, center DCP, and right DCP) when the value measured at the left DCP differs from the values measured at the other DCPs (in case of drift of the DVW to the right) or the value measured at the right DCP differs from the values measured at the other DCPs (in case of drift of the DVW to the left). For example, the value measured at the left DCP may be measured as a 1, and the values measured at the center and right DCPs may be measured as a 0. Because the measured values differ, drift of the DVW is detected, and consequently, the points within the DCR cannot all be reliably measured to have the same value. As another example, the center DCP value may be measured as a 1, but the left and right DCP values may be measured a 0. As in the previous example the points within the DCR are not all reliably measured to have the same value. But because the measured values differ in more than one neighbored pair of DCPs, data corruption is detected. The data corruption may be caused due to drift (e.g drift unrecognized over an unchanging series of 1's or 0's) or some other cause of disturbance not explained by drift alone. In this case the transaction must be restarted at the point where the corruption has been detected.

In an embodiment, when values are measured at three or more DCPs within a DCR, the direction of the drift can be detected. For example, referring back to the three-DCP example, a value measured at the left DCP may differ from a same value measured at the center and right DCPs. From this information, it can be inferred that not only has drift of the DVW occurred, but also that the DVW has drifted past the DCR, and that the DCR could be shifted to later in time to correct for the drift. As another example, a value measured at the right DCP may differ from a same value measured at the center and left DCPs. From this information, it can be inferred that not only has drift of the DVW occurred, but also that the DVW has drifted in front of the DCR, and that the DCR could be shifted to earlier in time to correct for the drift. Although detection of the direction of the drift has been discussed using three DCPs in a DCR, embodiments of the invention support detecting the direction of the drift with four or more DCPs using similar techniques, e.g. finding one or more differing values near the boundaries of the DCR. When the direction of the drift is correctly identified, the transaction can continue without needing to restart the transaction.

In an embodiment, drift of the DVW may occur but be initially unrecognized when more than one of the same values are transmitted sequentially. For example, drift of the DVW may occur during transmission of a series of 1's (e.g. "111111"), but the drift may not be detected when it occurs because measurement of values at varying DCPs will have the same values, even if the DCPs are measuring values that are outside the DVW. As long there is no signal transition, no error is produced when capturing data at a wrong position. After a long series of same values, the ability might get lost to determine the direction of the drift, because the drift already might have accumulated to affect the majority of the DCPs. For example, in case the DVW has moved by a whole clock period t, the drift would not be detected. In such cases the data is retransmitted to ensure the integrity of the received data. To observe the time limit for data transfers of the same value without transition, a counter can be implemented that tracks the number of times the same measured value occurs in a series of DCRs. Depending on the expected maximum change of the position of the DVW per time, a limit for this counter can be defined. In case the limit is exceeded, data integrity may not be able to be ensured anymore. To ensure data integrity, data can be retransmitted, starting from the point before the limit has been detected.

In block 210, the DCR is reconfigured in response to detecting the drift of the DVW. In an embodiment, master device 102 reconfigures the DCR. The DCR can be reconfigured in various ways.

In an embodiment, the position of the DCR is adjusted relative to a clock signal during the transaction by adjusting each individual DCP belonging to the DCR. In an embodiment, master device 102 adjusts the DCR. For example, the position of the DCR is adjusted so that the DCR, and consequently the DCPs, samples the signal later in time. As another example, the DCR is adjusted so that the DCR, and consequently the DCPs, samples the signal earlier in time. The DCR can be shifted by a predetermined amount, e.g. ¼ t, or any other amount. Alternatively or additionally, the size of the DCR can be adjusted, i.e. made longer or shorter.

In an embodiment, the position of the DCR is adjusted during a transaction. When this happens, the transaction can continue without incurring the overhead associated with restarting the transaction and beginning to send a new frame, which can include, for example, resetting the DCR based on a DLP.

In an embodiment, the position of the DCR is determined based on the values at the DCPs. In an embodiment, master device 102 determines the position. As discussed above, the values captured at the DCPs, and the identities of the DCPs that have differing values than the others, can inform master device 102 of the direction of the drift of the DVW, and therefore the direction to shift the DCR to compensate for the detected drift.

In an embodiment, the DCR is reconfigured after restarting the transaction. In an embodiment, master 102 reconfigures the DCR. For example, when the drift is detected, master device 102 can stop the current transaction with slave device 104. The transaction can be restarted whether the direction of the drift is known or not. For example, referring back to the three-DCP example, the value of the signal measured at the center DCP can differ from the same value measured at the left and right DCPs, and the direction of the drift may not be ascertained, even though a distortion has been detected. Because the integrity of the signal in the DVW is in question, the transaction may be restarted. Data values prior to the detection of the data corruption can be retained, so that the transaction is restarted at the point when the data integrity is in question. When the transaction restarts, the DCR can be reconfigured in one or more of various ways, e.g. using a DLP.

Figure 3:
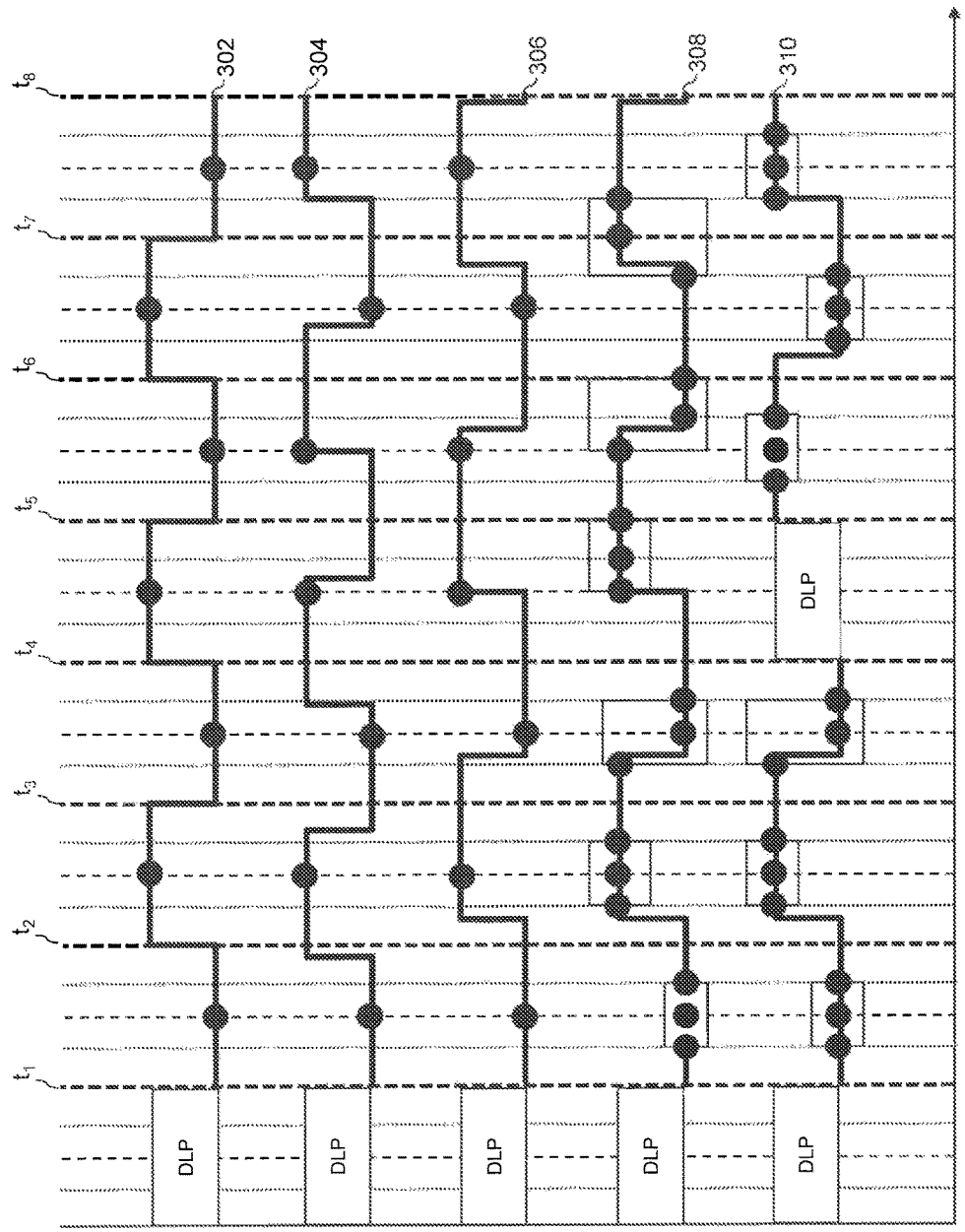
FIG. 3 is a block diagram of signals being processed using a process for detecting the drift of the data valid window in a transaction, according to an example embodiment.

FIG. 3 is a block diagram of signals being processed using a process for detecting the drift of the DVW in a transaction and includes signals 302, 304, 306, 308, and 310. In this example, signal 302 is a signal received by master device 102 from slave device 104, and is unaffected by operating conditions. Signals 304, 306, 308, and 310 are signals that carry the same information as signal 302 (i.e. "0101010"), but have become distorted during transmission due to one or more operating conditions. In this example, the DCR is ½ t wide, and begins ¼ t after the beginning of every clock cycle, e.g. $t_1+¼ t$, $t_2+¼ t$, etc. The dots on each of the signals represent DCPs within the DCRs.

In signal 302, which does not exhibit drift of the DVW, each value measured in the series of DCRs is correct. Hence, when the signal is measured at a DCP in the center of the DCR, as indicated by the dots on the signal, the values will result in "0101010".

Signals 304 and 306 exhibit drift of the DVW, so the values measured during the DCR may be incorrect. For example, if the DCP is the center of the DCR, the value of signals 304 and 306 will both be incorrectly received as "0101101".

Signal 308 depicts how the drift of the DVW is detected in a transaction by employing an embodiment of the invention. In this embodiment, the DCR comprises 3 DCPs: a left DCP at 0, a center DCP at ¼ t, and a right DCP at ½ t of the DCR. Further, the value of the signal is that measured at the center DCP. The DCRs are depicted as boxes surrounding the DCP dots.

In the first and second DCRs, which occur between times $t_1+¼ t$ and $t_1+¾ t$ and times $t_2+¼ t$ and $t_2+¾ t$, respectively, the values measured at all three DCPs are the same, so the values can be relied upon. In the third DCR, which occurs between times $t_3+¼ t$ and $t_3+¾ t$, the value of the signal at the left DCP differs from those of the signal at the center and right DCPs. This discrepancy indicates that drift of the DVW has occurred, and that the DCR should be shifted later in time. Thus, DCR can be shifted ¼ t later in time, so that the fourth DCR starts at time $t_4+½ t$. In the fourth DCR, the values measured at all three DCPs are the same, so the values can be relied upon. In the fifth DCR, which occurs between times $t_5+½ t$ and $t_6+½ t$, the value of the signal at the left DCP differs from those of the signal at the center and right DCPs. This discrepancy indicates that drift of the DVW has occurred, and that the DCR should be shifted later in time. Thus, DCR can be shifted ¼ t later in time, so that the sixth DCR starts at time $t_6+¾$ t. In the sixth DCR the value of the signal at the left DCP differs from those of the signal at the center and right DCPs. This discrepancy indicates that drift of the DVW has occurred, and that the DCR should be shifted later in time. Thus, DCR can be shifted ¼ t later in time, so that the seventh DCR (not shown) starts at time $t_7+t$. After undergoing this process, each of the values measured at the center DCPs correctly correspond to the transmitted "0101010".

Signal 310 depicts how an example DVW drift is detected in a transaction by employing an embodiment of the invention. In this embodiment, the DCR comprises 3 DCPs: a left DCP at 0, a center DCP at ¼ t, and a right DCP at ½ t. Further, the value of the signal is that measured at the center DCP. The DCRs are depicted as boxes surrounding the DCP dots.

In the first and second DCRs, which occur between times $t_1+¼$ t and $t_1+¼$ t and times $t_2+¼$ t and $t_2+¾$ t, respectively, the values measured at all three DCPs are the same, so the values can be relied upon. In the third DCR, which occurs between times $t_3+¼$ t and $t_3+¾$ t, the value of the signal at the left DCP differs from those of the signal at the center and right DCPs. This discrepancy indicates that drift of the DVW has occurred, and in this embodiment, the transaction is restarted upon detecting the drift. The DCR is reset using a DLP. In the remaining DCRs, the values measured at all the three DCPs in each DCR are the same, so the values can be relied upon. After undergoing this process, each of the values measured at the center DCPs correctly correspond to the transmitted "0101010".

Figure 4:
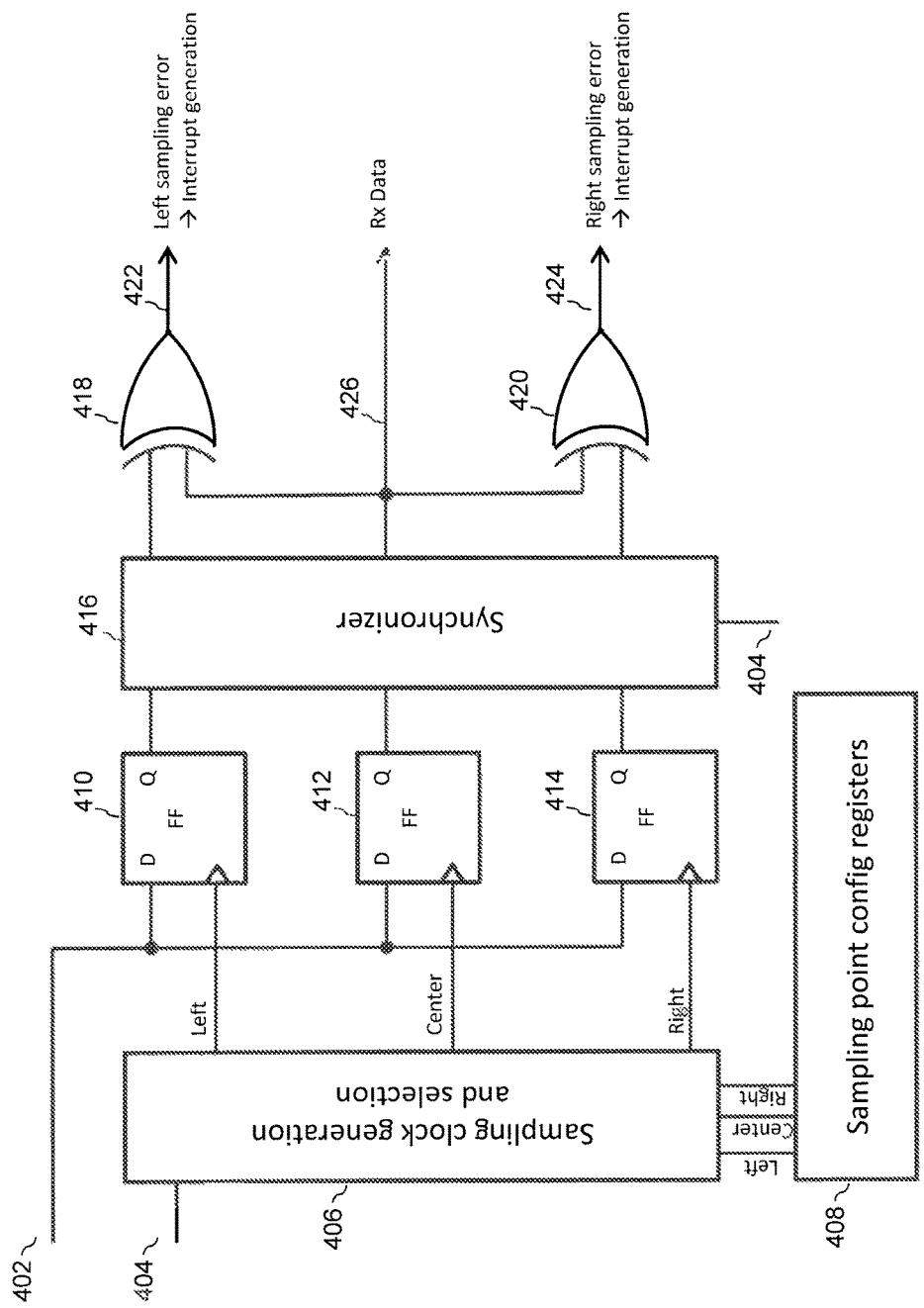
FIG. 4 is a block diagram of a circuit for detecting the drift of the data valid window in a transaction, according to an example embodiment.

FIG. 4 is a block diagram of a circuit 400 that includes serial data input (SDI) 402, bit rate clock (BRC) 404, sampling clock generator and selector 406, DCP configuration registers 408, left flip-flop (FF) 410, center FF 412, right FF 414, synchronizer 416, gates 418 and 420, left sampling error 422, right sampling error 424, and received data 426.

In an embodiment, master device 102 comprises circuit 400. SDI 402 is received over MISO 106, and BRC 404 is that transmitted on clock bus 106.

In an embodiment, sampling clock generator and selector 406 uses BRC 404 and DCP configuration information from DCP configuration registers 408 to signal to FFs 410, 412, and 414 to sample and store the value from SDI 402. For example, the DCPs can be at times ¼ t, ½ t, and ¾ t. Sampling clock generator and selector 406 reads the DCP configuration from DCP configuration registers 408. When the cycle of BRC 404 reaches time ¼ t, sampling clock generator and selector 406 will signal to left FF 410 to read and store the current value of SDI 402. When the cycle of BRC 404 reaches time ½ t, sampling clock generator and selector 406 will signal to center FF 412 to read and store the current value of SDI 402. When the cycle of BRC 404 reaches time ¾ t, sampling clock generator and selector 406 will signal to right FF 414 to read and store the current value of SDI 402.

In an embodiment, DCP configuration registers 408 comprise three registers, one for each of the left, right, and center sampling point. Each register can be configured to a value, e.g. a value between 0 and 23. Configuration of a register to the value n has the consequence of delaying the corresponding sampling clock by n delay buffers, units, or taps. In some cases, the delay is n*delay tap, wherein delay tap is the nominal delay of one delay buffer. Often, delay tap depends on the process, voltage, temperature conditions, so the real delay value can be approximated by the formula above. Because the goal is to sample the data in the center, and not necessarily to configure a delay with an exact delay time, some iterations can be used to correctly configure the sampling delay. Configuring the sampling delay can be accomplished, e.g. by using different delay values and checking the correctness of the DLP. Although this example configuration is discussed, embodiments of the invention support other implementations for setting the DCP configuration, e.g. using a delay-locked loop (DLL) for generating a set of delayed clocks with the same frequency, by using a much higher input frequency and different edges for sampling, or by delaying the data by a number of delay buffers (for example m-n delay buffers, where m is the total number of available delay buffers) and capturing the data one or more sampling clock cycles later.

In an embodiment, synchronizer 416 outputs the results from FFs 410, 412, and 414 at or during a set time. For example, synchronizer can output the results independent from the phase of the DCPs, synchronous to the BRC 404.

In an embodiment, gates 418 and 420 compare the values at the left and right DCPs, respectively, to the value at the center DCP. Gate 418 outputs sampling error 422 when the value at the left DCP is not the same as the value at the center DCP. Similarly, gate 420 outputs sampling error 424 when the value at the right DCP is not the same as the value at the center DCP.

In an embodiment, received data 426 is the value measured at the center DCP. Received data 426 can be used as the value of the signal during the DCR, even if drift is detected and a left sampling error 422 or right sampling error 424 is outputted. If both left and right sampling errors 422 and 424 are detected, that suggests that received data 426 may be an invalid or unreliable measurement of the signal in the DCR.

Example Computer System

Figure 5:
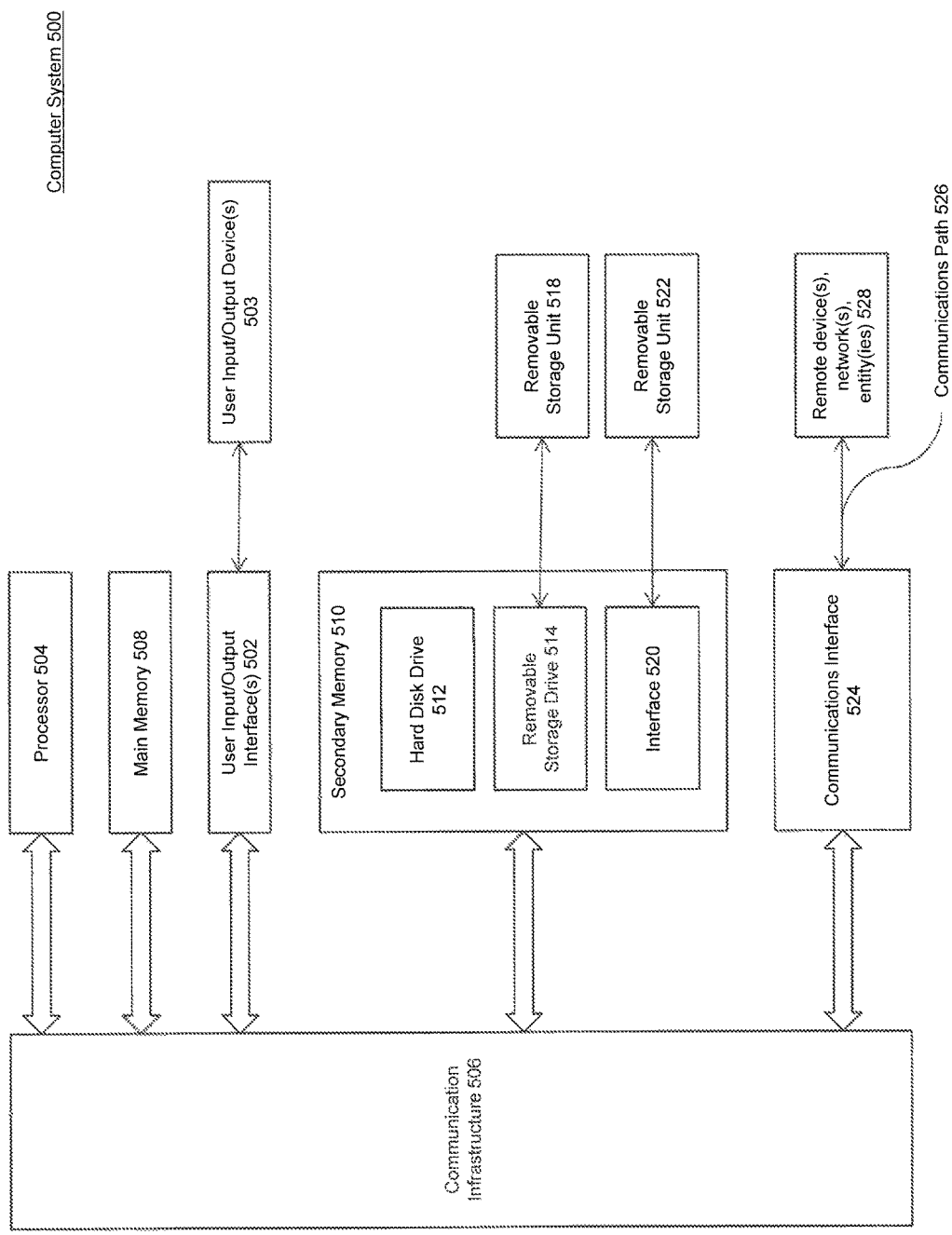
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc. Embodiments of the invention (or portions thereof) can also be implemented using hardware state machines, application-specific integrated circuits (ASIC) and/or other hardware components specifically configured to perform the operations described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

One or more processor 504 may each be a hardware state machine, ASIC, or controller.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device raving stored thereon computer software (control logic) and/or data. Removable storage unit 518 may be a floppy disk, magnetic tape, compact disk, DVD, optical storage disk, and/any other computer data storage device. Removable storage drive 514 leads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:
1. A method, comprising:
obtaining a data learning pattern prior to a transaction, the transaction comprising reception of a data frame;
configuring a width of a data capture range based on the data learning pattern, the data capture range comprising a time period which comprises data capture points;
measuring values of a signal at the data capture points;
detecting a drift of the data valid window based on the values at the data capture points;
recording in a counter a number of times a same measured value occurs in a series of data capture ranges including the data capture range; and
recovering data in the data frame in response to detecting that the recorded number exceeds a limit.

2. The method of claim 1, further comprising:
reconfiguring the data capture range in response to detecting the drift.

3. The method of claim 2, the reconfiguring further comprising:
shifting the time period of the data capture range relative to a clock signal.

4. The method of claim 3, the reconfiguring further comprising:
determining an amount of the shifting based on the values at the data capture points.

5. The method of claim 2, the reconfiguring further comprising:
reconfiguring the data capture range after stopping and before restarting the transaction, wherein recovering data in the data frame comprises the restarting the transaction.

6. The method of claim 1, wherein:
the data capture points comprise at least a left data capture point, a right data capture point, and an interior data capture point between the left and right data capture points,
detecting the drift further comprises determining that the data valid window has drifted if a first value at the left data capture point or a second value at the right data capture point is different than a third value at the interior data capture point; and
the method further comprises detecting corruption of the data frame if the third value is different than each of the first value and the second value.

7. A system, comprising:
a memory; and
at least one processor coupled to the memory and configured to:
obtain a data learning pattern prior to a transaction comprising reception of a data frame;
configure a width of a data capture range based on the data learning pattern, the data capture range comprising a time period which comprises data capture points;
measure values of a signal at the data capture points;
detect a drift of a data valid window based on the values at the data capture points;
record in a counter a number of times a same measured value occurs in a series of data capture ranges including the data capture range; and
recover data in the data frame in response to detecting that the recorded number exceeds a limit.

8. The system of claim 7, the at least one processor further configured to:
reconfigure the data capture range in response to detecting the drift.

9. The system of claim 8, wherein to reconfigure further comprises:
shift the time period of the data capture range relative to a clock signal.

10. The system of claim 9, wherein to reconfigure further comprises:
determine an amount of the shift based on the values at the data capture points.

11. The system of claim 8, wherein the at least one processor is further configured to:
reconfigure the data capture range after stopping and before restarting the transaction.

12. The system of claim 7, wherein the data capture points comprise at least a left data capture point, a right data capture point, and an interior data capture point between the left and right data capture points, and wherein the at least one processor is configured to:
determine that the data valid window has drifted if a first value at the left data capture point or a second value at the right data capture point is different than a third value at the interior data capture point.

13. A non-transitory computer-readable device having instructions stored thereon that, when executed by at least one computing device, causes the at least one computing device to perform operations comprising:
obtaining a data learning pattern, prior to a transaction, the transaction comprising reception of a data frame;
configuring a width of a data capture range based on the data learning pattern, the data capture range comprising a time period which comprises data capture points;
measuring values of a signal at the data capture points;
detecting a drift of a data valid window based on the values at the data capture points;
recording in a counter a number of times a same measured value occurs in a series of data capture ranges including the data capture range; and
recovering data in the data frame in response to detecting that the recorded number exceeds a limit.

14. The computer-readable device of claim 13, the operations further comprising:
reconfiguring the data capture range in response to detecting the drift.

15. The computer-readable device of claim 14, the reconfiguring further comprising:
shifting the time period of the data capture range relative to a clock signal.

16. The computer-readable device of claim 15, the reconfiguring further comprising:
determining an amount of the shifting based on the values at the data capture points.

17. The computer-readable device of claim 14, the operations further comprising:
reconfiguring the data capture range after stopping and before restarting the transaction.

18. The computer-readable device of claim 13, wherein the data capture points comprise at least a left data capture point, a right data capture point, and an interior data capture point between the left and right data capture points, and the operations further comprising:
determining that the data valid window has drifted if a first value at the left data capture point or a second value at the right data capture point is different than a third value at the interior data capture point.

19. The method of claim 2, the reconfiguring further comprising:
reconfiguring the data capture range during the transaction.

20. The method of claim 3, the shifting further comprising:
shifting the time period relative to a clock signal by a predetermined amount of time.

21. The system of claim 8, wherein the at least one processor is further configured to:
reconfigure the data capture range during the transaction.

22. The system of claim 9, wherein to reconfigure further comprises:
shifting the time period relative to a clock signal by a predetermined amount of time.

23. The computer-readable device of claim 14, the operations further comprising:
reconfiguring the data capture range during the transaction.

24. The computer-readable device of claim 15, the reconfiguring further comprising:
shifting the time period relative to a clock signal by a predetermined amount of time.

\* \* \* \* \*